(12) United States Patent
Kogo

(10) Patent No.: US 11,499,733 B2
(45) Date of Patent: Nov. 15, 2022

(54) AIR CONDITIONING SYSTEM OPERATION MODE SWITCHING METHOD, AIR CONDITIONING SYSTEM OPERATION MODE SWITCHING DEVICE, AND AIR CONDITIONING SYSTEM OPERATION MODE SWITCHING CONTROL PROGRAM

(71) Applicant: NEC Corporation, Tokyo (JP)

(72) Inventor: Takuma Kogo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 31 days.

(21) Appl. No.: 16/611,259

(22) PCT Filed: May 11, 2017

(86) PCT No.: PCT/JP2017/017914
§ 371 (c)(1),
(2) Date: Nov. 6, 2019

(87) PCT Pub. No.: WO2018/207324
PCT Pub. Date: Nov. 15, 2018

(65) Prior Publication Data
US 2020/0158363 A1 May 21, 2020

(51) Int. Cl.
*F24F 11/46* (2018.01)
*F24F 11/64* (2018.01)
(Continued)

(52) U.S. Cl.
CPC .............. *F24F 11/46* (2018.01); *F24F 11/54* (2018.01); *F24F 11/64* (2018.01); *F24F 11/65* (2018.01); *G05B 19/042* (2013.01); *F24F 2110/10* (2018.01); *F24F 2110/12* (2018.01); *F24F 2120/10* (2018.01); *F24F 2120/20* (2018.01);
(Continued)

(58) Field of Classification Search
CPC ....................................................... F24F 11/65
See application file for complete search history.

(56) References Cited

U.S. PATENT DOCUMENTS

| | | | |
|---|---|---|---|
| 2015/0167999 A1* | 6/2015 | Seem | F24F 11/30 700/276 |
| 2018/0299159 A1* | 10/2018 | Ajax | F24F 11/0001 |
| 2020/0025402 A1* | 1/2020 | Bell | G05D 23/1904 |

FOREIGN PATENT DOCUMENTS

| | | |
|---|---|---|
| JP | 2004-116820 A | 4/2004 |
| JP | 2004-271149 A | 9/2004 |

(Continued)

OTHER PUBLICATIONS

International Search Report for PCT/JP2017/017914 dated Aug. 15, 2017 (PCT/ISA/210).

*Primary Examiner* — Nathan L Laughlin
(74) *Attorney, Agent, or Firm* — Sughrue Mion, PLLC

(57) ABSTRACT

An air conditioning system control device 10 includes: a switching unit 11 that, when a parameter relating to the indoor environment in which the air conditioning system operates does not satisfy a first condition while the air conditioning system is operating in a first operation mode that is an operation mode in which setting values computed on the basis of a prediction model are used as the setting values for the air conditioning system, switches the operation mode of the air conditioning system to a second operation mode that is an operation mode in which the computed setting values are not used as the setting values for the air conditioning system.

13 Claims, 4 Drawing Sheets

(51) Int. Cl.
- *F24F 11/65* (2018.01)
- *F24F 11/54* (2018.01)
- *G05B 19/042* (2006.01)
- *F24F 120/10* (2018.01)
- *F24F 140/60* (2018.01)
- *F24F 120/20* (2018.01)
- *F24F 130/20* (2018.01)
- *F24F 140/50* (2018.01)
- *F24F 130/10* (2018.01)
- *F24F 110/10* (2018.01)
- *F24F 110/12* (2018.01)

(52) U.S. Cl.
CPC ....... *F24F 2130/10* (2018.01); *F24F 2130/20* (2018.01); *F24F 2140/50* (2018.01); *F24F 2140/60* (2018.01); *G05B 2219/2614* (2013.01)

(56) References Cited

FOREIGN PATENT DOCUMENTS

| | | |
|---|---|---|
| JP | 2014-194290 A | 10/2014 |
| JP | 2015-017718 A | 1/2015 |
| JP | 2015-183899 A | 10/2015 |

\* cited by examiner

AIR CONDITIONING SYSTEM OPERATION MODE SWITCHING METHOD, AIR CONDITIONING SYSTEM OPERATION MODE SWITCHING DEVICE, AND AIR CONDITIONING SYSTEM OPERATION MODE SWITCHING CONTROL PROGRAM

CROSS REFERENCE TO RELATED APPLICATIONS

This application is a National Stage of International Application No. PCT/JP2017/017914 filed May 11, 2017, the disclosure of which is incorporated herein in its entirety by reference.

TECHNICAL FIELD

The present invention relates to an air conditioning system operation mode switching method, an air conditioning system operation mode switching device, and an air conditioning system operation mode switching program.

BACKGROUND ART

For an air conditioning system, there has been proposed an operation method of maximizing the electrical energy efficiency, thermal energy efficiency, and mechanical energy efficiency of air conditioners themselves, and considering comfort in an air-conditioned space. In particular, a method of computing, with a computer, the operation plan of the air conditioning system on the basis of a prediction model is superior to other methods, because the method enables the power consumption of the air conditioners to have the optimum value while the comfort is satisfied.

However, in a planned operation performed in accordance with the operation plan computed on the basis of the prediction model, a non-optimal operation may be performed due to a prediction error. In particular, performance degradation such that comfort is not satisfied occurs.

For example, when an operation plan for satisfying comfort is computed, indoor temperature during operation is predicted on the basis of the prediction model. However, perfect prediction of the flow of people, changes in weather, and the like is difficult, so that the predicted values of the indoor temperature during operation may include an error.

When the predicted values of the indoor temperature during operation include an error, the indoor temperature adjusted by the operation performed in accordance with the operation plan is highly likely to deviate from the comfortable temperature having the original target value. In addition, there is a possibility that the adjusted indoor temperature becomes an uncomfortable temperature for humans and the target energy saving performance is not satisfied.

Therefore, for example, when it is determined that the target comfort or energy saving performance is not satisfied because a prediction error that is an error included in the predicted values is large, it is required to interrupt operation in a planned operation mode based on the prediction model and switch to operation in a normal operation mode.

Patent Literature (PTL) 1 describes a technique of switching an operation mode of an air conditioning system. PTL 1 describes an air conditioning apparatus that does not have a memory that stores outside air temperature and indoor temperature for selecting an operation mode, and quickly responds to automatic selection of an operation mode that is close to the user's sensation. The air conditioning apparatus described in PTL 1 is capable of switching a planned operation mode based on a prediction model to a normal operation mode, the planned operation mode being an operation mode of air conditioners.

CITATION LIST

Patent Literature

PTL 1: Japanese Patent Application Laid-Open No. 2004-271149

SUMMARY OF INVENTION

Technical Problem

PTL 1, however, does not describe that the air conditioning apparatus switches from the planned operation mode to the normal operation mode how considering the state of indoor environment and the energy saving performance. That is, the air conditioning apparatus described in PTL 1 fails to perform switching even when indoor temperature becomes an uncomfortable temperature due to a prediction error or the like during operation in the planned operation mode, and has difficulty in solving an issue that an occupant feels uncomfortable.

In addition, when switching between the planned operation mode and the normal operation mode is highly frequent, indoor temperature changes frequently, so that the occupant is likely to feel uncomfortable. Moreover, if an operation time in the normal operation mode is unnecessarily long, it is difficult to obtain high energy saving performance. The air conditioning apparatus described in PTL 1 has difficulty in solving the above described two technical issues unique to an air conditioning system.

That is, when the air conditioning apparatus described in PTL 1 is used, a non-optimal air conditioning operation is likely to be performed. Thus, there is a need for a technique of allowing switching of an operation mode of an air conditioning system on the basis of the state of indoor environment.

Therefore, an objective of the present invention is to provide an air conditioning system operation mode switching method, an air conditioning system operation mode switching device, and an air conditioning system operation mode switching program that are capable of switching an operation mode of an air conditioning system in consideration of the state of indoor environment, for solving the above described issues.

Solution to Problem

The air conditioning system operation mode switching method according to the present invention includes: when a parameter relating to the indoor environment in which the air conditioning system operates does not satisfy a first condition while the air conditioning system is operating in a first operation mode that is an operation mode in which setting values computed on the basis of a prediction model are used as the setting values for the air conditioning system, switching the operation mode of the air conditioning system to a second operation mode that is an operation mode in which the computed setting values are not used as the setting values for the air conditioning system.

The air conditioning system operation mode switching device according to the present invention includes: a switching unit that, when a parameter relating to the indoor environment in which the air conditioning system operates does not satisfy a first condition while the air conditioning system is operating in a first operation mode that is an operation mode in which setting values computed on the basis of a prediction model are used as the setting values for the air conditioning system, switches the operation mode of the air conditioning system to a second operation mode that is an operation mode in which the computed setting values are not used as the setting values for the air conditioning system.

The air conditioning system operation mode switching program according to the present invention for causing a computer to execute processing of: when a parameter relating to the indoor environment in which the air conditioning system operates does not satisfy a first condition while the air conditioning system is operating in a first operation mode that is an operation mode in which setting values computed on the basis of a prediction model are used as the setting values for the air conditioning system, switching the operation mode of the air conditioning system to a second operation mode that is an operation mode in which the computed setting values are not used as the setting values for the air conditioning system.

Advantageous Effects of Invention

According to the present invention, an operation mode of an air conditioning system can be switched in consideration of the state of indoor environment.

DESCRIPTION OF EMBODIMENTS

First Example Embodiment

Description of Configuration

Figure 1:
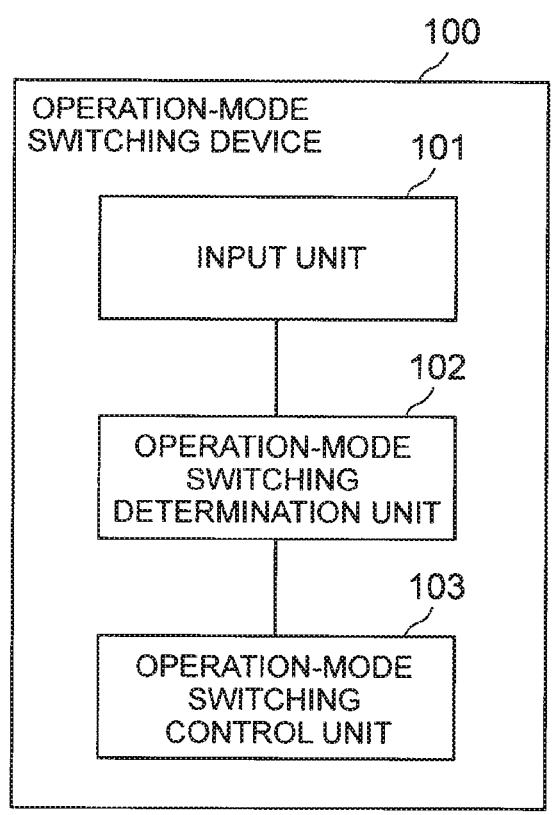
FIG. 1 is a block diagram showing a configuration example of a first example embodiment of an operation-mode switching device according to the present invention.

Hereinafter, an example embodiment of the present invention will be described with reference to the drawings. FIG. 1 is a block diagram showing a configuration example of a first example embodiment of an operation-mode switching device according to the present invention. An operation-mode switching device 100 of the present example embodiment corresponds to an air conditioning system control device.

For the operation mode of an air conditioning system, provided are two operation modes: a planned operation mode based on a prediction model; and a normal operation mode not based on the prediction model. In the planned operation mode, setting values predicted by the prediction model are used as setting values for the air conditioning system. In contrast, in the normal operation mode, the setting values predicted by the prediction model are not used as setting values for the air conditioning system.

The operation-mode switching device 100 of the present example embodiment is a device that provides a specific operation-mode switching method of automatically switching the operation mode of the air conditioning system in accordance with a predetermined condition.

Note that for the normal operation mode, a facility manager or an occupant manually manages, for example, setting values for the air conditioners, such as target indoor temperature, supply air temperature, and supply air volume. The facility manager or the like manually inputs setting values from a graphical user interface (GUI) of, for example, a building management system, or a control panel. For the normal operation mode, the setting values are changed about several times a year, for example. In addition, the facility manager or the like determines the setting values on the basis of know-how and the like.

In contrast, for the planned operation mode, as described above, the setting values are automatically managed by direct transmission of the setting values to the air conditioners from a computer. The computer computes the setting values on the basis of objective indices such as power consumption and comfort, with measured data, predicted data, a prediction model, and the like. For the planned operation mode, the computer can update the setting values for the air conditioners in several minutes to tens of minutes.

As shown in FIG. 1, the operation-mode switching device 100 of the present example embodiment includes an input unit 101, an operation-mode switching determination unit 102, and an operation-mode switching control unit 103.

Numerical data and the like required for determination processing by the operation-mode switching determination unit 102 is input to the input unit 101. For example, regarding a target air conditioning system, measured values and predicted values of each type of parameter relating to the indoor environment, setting values, and a prediction model are input in the input unit 101.

The parameter relating to the indoor environment of the present example embodiment includes at least one of indoor temperature that is temperature in indoor environment, a comfort level in the indoor environment, and the power consumption of the target air conditioning system.

The operation-mode switching determination unit 102 has a function of determining whether or not to switch the operation mode of the target air conditioning system, on the basis of a predetermined computation result. The operation-mode switching determination unit 102 performs, for example, a predetermined computation every predetermined time.

Note that the operation-mode switching determination unit 102 stores the present operation mode of the target air conditioning system. For example, the operation-mode switching determination unit 102 stores the present operation mode as an operation-mode control value to be used for controlling the operation mode of the air conditioning system by the operation-mode switching control unit 103. Hereinafter, "operation mode switching" by the operation-mode switching determination unit 102 means "operation-mode control value switching" by the operation-mode switching determination unit 102.

Note that the operation-mode switching determination unit 102 may control the operation mode of the target air conditioning system with a method different from the above described method. For example, the operation-mode switching determination unit 102 may directly input a command for instructing control in a switched operation mode, to the operation-mode switching control unit 103.

The operation-mode switching determination unit 102 switches the operation mode on the basis of a condition satisfaction rate in the planned operation mode to be described later and a predetermined threshold. For example, if the condition satisfaction rate is smaller than a first predetermined threshold when the operation mode is the planned operation mode, the operation-mode switching determination unit 102 switches the operation mode to the normal operation mode.

In addition, for example, if the condition satisfaction rate is greater than a second predetermined threshold when the operation mode is the normal operation mode, the operation-mode switching determination unit 102 switches the operation mode to the planned operation mode. Note that as described later, the second predetermined threshold is greater than or equal to the first predetermined threshold.

The operation-mode switching control unit 103 has a function of switching the operation mode of the target air conditioning system, on the basis of a determination result of the operation-mode switching determination unit 102. The operation-mode switching control unit 103 switches the operation mode of the air conditioning system, with an operation-mode control value input from the operation-mode switching determination unit 102.

Figure 2:
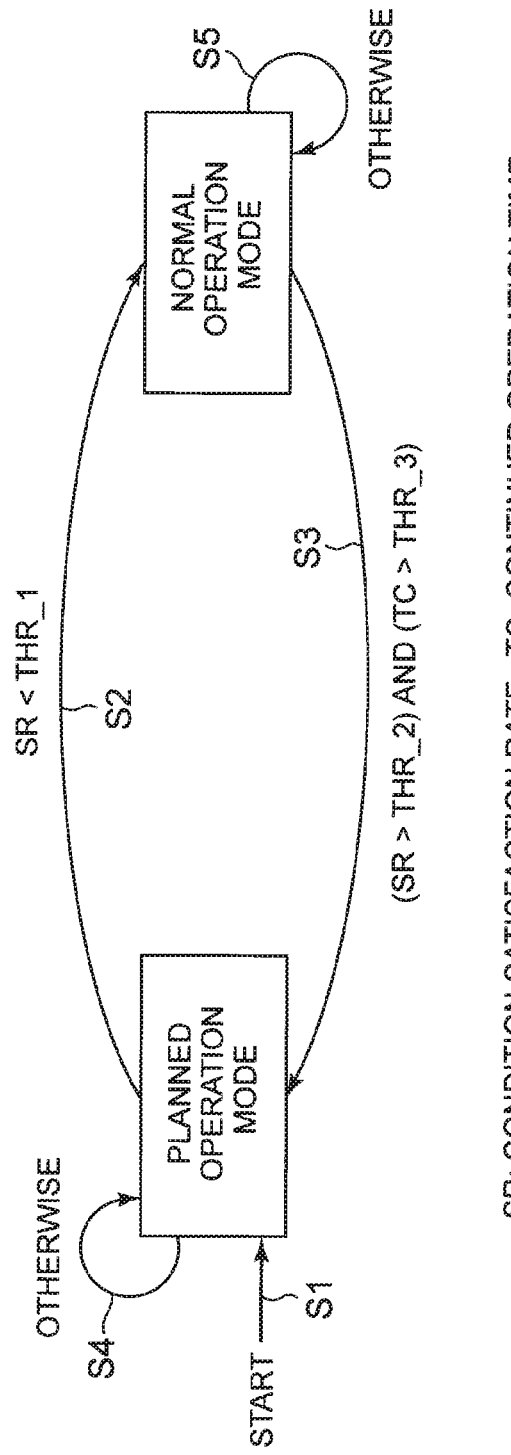
FIG. 2 is a state transition diagram used in operation-mode switching determination processing by an operation-mode switching determination unit 102.

FIG. 2 is a state transition diagram used in the operation-mode switching determination processing by the operation-mode switching determination unit 102. The state transition diagram indicates an operation-mode switching condition in each operation mode.

First, the target air conditioning system starts operation in the planned operation mode (step S1).

When a first condition that a condition satisfaction rate SR is smaller than a threshold THR_1 is satisfied while the air conditioning system is operating in the planned operation mode, the operation-mode switching determination unit 102 switches the operation mode of the air conditioning system to the normal operation mode (step S2). Note that the condition satisfaction rate is an example of a condition satisfaction level computed on the basis of a degree that a value of a parameter satisfies a condition associated with the parameter.

In addition, when a second condition that the condition satisfaction rate SR becomes greater than a threshold THR_2 and a continued operation time TC in the normal operation mode is longer than a threshold THR_3 while the air conditioning system is operating in the normal operation mode is satisfied, the operation-mode switching determination unit 102 switches the operation mode of the air conditioning system to the planned operation mode (step S3).

Note that the threshold THR_2 in the present example embodiment is greater than or equal to the threshold THR_1. Since the threshold THR_2 is greater than or equal to the threshold THR_1, the switching frequencies of the operation mode are reduced.

In addition, in step S3, a constraint condition associated with to the continued operation time TC is also used in the determination processing. Specifically, when the continued operation time TC in the normal operation mode is less than or equal to a predetermined time, the operation-mode switching determination unit 102 cannot switch the operation mode from the normal operation mode to the planned operation mode.

That is, the operation-mode switching determination unit 102 uses the constraint condition associated with the continued operation time TC to reduce the switching frequencies of the operation mode even when the condition satisfaction rate SR is improved easily. With the above settings, the operation-mode switching determination unit 102 of the present example embodiment is less likely to switch from the normal operation mode to the planned operation mode than to switch from the planned operation mode to the normal operation mode.

When the first condition or the second condition described above is not satisfied, the operation-mode switching determination unit 102 maintains the operation mode of the air conditioning system at the present operation mode (step S4 and step S5).

Hereinafter, the following is an example of a method of computing the condition satisfaction rate SR. The condition satisfaction rate SR is computed as follows, for example:

[Mathematical Formula 1]

$$SR = \sum_{(t,p) \in T \times P} SR_p^t WP_p^t \quad \text{Expression (1)}$$

Note that $SR_p^t$ in Expression (1) represents a parameter condition satisfaction rate (Satisfaction Rate) regarding a timing t and a parameter p. The parameter condition satisfaction rate represents a degree that a value of a parameter satisfies a condition associated with the parameter. In addition, $WP_p^t$ represents a weight coefficient (Weight for inter-Parameter) of $SR_p^t$. The weight coefficient $WP_p^t$ in the present example embodiment is set to a fixed value by settings or the like.

Moreover, the timing t in Expression (1) represents an element of a timing set T indicated below.

[Mathematical Formula 2]

$$T = \{\text{present}, \text{past}\} \quad \text{Expression (2)}$$

Note that in Expression (2), present represents the present time and past represents the past time. Note that the element of the timing set T may be a value indicating specific time. In addition, it is preferable that the value indicating the specific time includes the present time and the past time.

The timing set T in the present example embodiment is set to a fixed value by settings or the like. Similarly, the parameter p in Expression (1) represents an element of a parameter set P indicated below.

[Mathematical Formula 3]

$$P = \{mv_{temp}, pe_{temp}, pe_{comfort}, pe_{power}, pe_{solar}, pe_{oat}\} \quad \text{Expression (3)}$$

Note that $mv_{temp}$ in Expression (3) represents a measured value of indoor temperature. In addition, $pe_{temp}$ represents a prediction error of the indoor temperature. Moreover, $pe_{comfort}$ represents a prediction error of a comfort level. Furthermore, $pe_{power}$ represents a prediction error of the power consumption of the air conditioning system. Furthermore, $pe_{solar}$ represents a prediction error of solar radiation. Furthermore, $pe_{oat}$ represents a prediction error of outside air temperature.

Note that each prediction error of the present example embodiment is an error between measured values of a parameter, and predicted values of the parameter by a prediction model. The parameter set P in the present example embodiment is set to a fixed value by settings or the like.

Note that as the comfort level, for example, there may be used predicted mean vote (PMV: predicted thermal sensation vote) and predicted percentage of dissatisfied (PPD: predicted percentage of people who feel uncomfortable).

The PMV is a thermal environment evaluation index that indicates the association between the thermal load on the human body and the thermal sensation of humans.

In Expression (1), the sum total over all possible combinations of the timing t and the parameter p of a parameter condition satisfaction rate $SR_p^t$ multiplied by the weight coefficient $WP_p^t$ is computed. That is, the condition satisfaction rate is computed on the basis of the parameter condition satisfaction rate computed for each of one or more parameters. The condition satisfaction rate SR means that the greater the value is, the more the planned operation is performed as expected.

In addition, the weight coefficient $WP_p^t$ in Expression (1) satisfies the following conditional expression:

[Mathematical Formula 4]

$$\sum_{(t,p)\in T\times P} WP_p^t = 1 \qquad \text{Expression (4)}$$

That is, the sum total of the weight coefficient $WP_p^t$ over all possible combinations of the timing t and the parameter p is equal to 1.

Note that the condition satisfaction rate SR may be computed with a computation method different from the computation method indicated in Expression (1). For example, the condition satisfaction rate SR may be computed with a computation method based on a decision tree. When the condition satisfaction rate SR is computed with the computation method based on the decision tree, the condition satisfaction rate SR is also computed for cases that are not expressed by Expressions (1) and (4).

In addition, the parameter condition satisfaction rate $SR_p^t$ in Expression (1) is computed as follows, for example:

[Mathematical Formula 5]

$$SR_p^t = \begin{cases} 1, & THR_p^t\_1 \leq WM_p^t \leq THR_p^t\_2 \\ 0, & \text{otherwise} \end{cases} \qquad \text{Expression (5)}$$

Note that $WM_p^t$ in Expression (5) represents a weighted mean value (Weighted Mean) of the parameter regarding the timing t and the parameter p. In addition, $THR_p^t\_1$ represents a parameter threshold regarding the timing t and the parameter p. Moreover, $THR_p^t\_1$ is the lower limit of $WM_p^t$.

Furthermore, $THR_p^t\_2$ represents a parameter threshold regarding the timing t and the parameter p. $THR_p^t\_2$ is the upper limit of $WM_p^t$. The parameter threshold $THR_p^t\_1$ and the parameter threshold $THR_p^t\_2$ in the present example embodiment are values defined by settings or the like.

As indicated in Expression (5), the parameter condition satisfaction rate $SR_p^t$ results in 1, when the weighted mean value $WM_p^t$ of the parameter is a value within the threshold range. In addition, the parameter condition satisfaction rate $SR_p^t$ results in 0, when the weighted mean value $WM_p^t$ of the parameter is a value outside the threshold range.

What the parameter condition satisfaction rate $SR_p^t$ results in 0 corresponds to what a condition associated with the parameter relating to the indoor environment is not satisfied, the condition being that the value of the parameter is within a predetermined range. The range expressed by the two thresholds indicated in Expression (5) is a range of values that are preferably taken by the weighted mean value $WM_p^t$ of the parameter.

Note that the parameter condition satisfaction rate $SR_p^t$ may be computed with a computation method different from the computation method indicated in Expression (5). For example, a computational expression may be defined such that the parameter condition satisfaction rate $SR_p^t$ takes continuous values between 0 and 1 instead of the binary values.

In addition, the weighted mean value $WM_p^t$ of the parameter in Expression (5) is computed as follows, for example:

[Mathematical Formula 6]

$$WM_p^t = \int_0^{TW_p^t} PV_p^t(TP_p^t - \tau)WT_p^t(\tau)d\tau \qquad \text{Expression (6)}$$

Note that $PV_p^t(\tau)$ in Expression (6) represents a parameter value at time $\tau$ regarding the timing t and the parameter p. In addition, $TW_p^t$ represents a time window (Time Window) regarding the timing t and the parameter p. The time window $TW_p^t$ is used as the trace-back time from the present time to a past time, when the weighted mean value is computed. With the time window $TW_p^t$, a past measured value is included in the parameter value $PV_p^t$.

In addition, $TP_p^t$ in Expression (6) represents the present time (Time of Present) regarding the timing t and the parameter p. When the timing t is present, $TP_p^t$ results in the time when the computation is performed. In contrast, when the timing t is past, $TP_p^t$ results in predetermined time in past.

Moreover, $WT_p^t$ in Expression (6) represents a weight function (Weight for Time series) of the parameter value $PV_p^t$. Furthermore, the weight function $WT_p^t(\tau)$ represents the weight of the parameter value $PV_p^t$ at a trace-back time $\tau$. The weight function $WT_p^t$ of the present example embodiment is a function determined by settings or the like.

In Expression (6), the weighted mean of the parameter value $PV_p^t$ is computed with the weight function $WT_p^t$ traced back from the present time $TP_p^t$ to predetermined time $(TP_p^t - TW_p^t)$. Specifically, in Expression (6), the weighted mean value $WM_p^t$ of the parameter is computed as an integral over the time window of the parameter value $PV_p^t$ multiplied by the weight function $WT_p^t(\tau)$.

Furthermore, the weight function $WT_p^t(\tau)$ in Expression (6) satisfies the following conditional expression:

[Mathematical Formula 7]

$$\int_0^{TW_p^t} WT_p^t(\tau)d\tau = 1 \qquad \text{Expression (7)}$$

That is, the integral value of the weight function $WT_p^t(\tau)$ over the time window is equal to 1.

As described above, the parameter condition satisfaction rate $SR_p^t$ is computed on the basis of the parameter thresholds corresponding to the parameter. More specifically, whether or not the value of the parameter is within the predetermined range defined by the upper limit and the lower limit indicated in Expression (5) is used as a condition associated with the parameter relating to the indoor environment.

The parameter condition satisfaction rate $SR_p^t$ is computed by comparison between the weighted mean value $WM_p^t$ of the parameter from predetermined time to the past time by a predetermined time window and a parameter threshold. In addition, the parameter condition satisfaction rate $SR_p^t$ is computed for each of one or more times, such as the present time and the predetermined time in past.

As indicated in Expression (1), the operation-mode switching determination unit 102 determines whether or not to switch the operation mode, considering a plurality of parameters, the parameters being factors of performance degradation of the planned operation. Note that the operation-mode switching determination unit 102 may consider only one parameter.

Therefore, use of the operation-mode switching device 100 of the present example embodiment appropriately ensures an operation time in the planned operation mode.

As described above, the value of the parameter relating to the indoor environment includes the measured value of the parameter. In particular, the values of the parameter include the measured values of indoor temperature. In addition, the measured values of the parameter include measured values at a date and time in past earlier than a date and time when the condition satisfaction level is computed.

Moreover, the value of the parameter relating to the indoor environment includes an index indicating the accuracy of the predicted values of the parameter based on the prediction model. As the index indicating the accuracy of predicted values of the parameter, the prediction error that is the error between the measured values and the predicted values of the parameter is used.

More specifically, the prediction error includes any of a prediction error of the indoor temperature, a prediction error of the comfort level, a prediction error of the power consumption of the air conditioning system, a prediction error of the solar radiation, and a prediction error of the outside air temperature, or a combination of each prediction error. In addition, the prediction error includes the error between the measured values of the parameter at the date and time in past earlier than the date and time when the condition satisfaction level is computed and predicted values of the parameter predicted on the date and time in past.

For example, when the prediction error of the indoor temperature is small and the prediction error of the solar radiation and the prediction error of outside air temperature are large, indoor temperature predicted by the prediction model is likely to be inaccurate as a result. That is, an error is likely to be included in the indoor temperature obtained by the prediction model. Then, there is a possibility that obtaining of an operation plan for achieving comfort and energy efficiency is difficult.

When the obtaining of the operation plan that can achieve the energy efficiency is difficult as described above, the condition satisfaction rate SR becomes smaller than the threshold THR_1. Therefore, the operation-mode switching determination unit 102 of the present example embodiment can switch the operation mode to the normal operation mode, considering the prediction error of the solar radiation and the prediction error of the outside air temperature.

In addition, as indicated in Expressions (5) to (7), the operation-mode switching determination unit 102 of the present example embodiment computes the condition satisfaction rate SR traced back to the predetermined time in past. That is, even if the parameter varies temporarily, the condition satisfaction rate SR does not vary greatly, so that the switching frequencies of the operation mode are reduced.

Moreover, the operation-mode switching determination unit 102 of the present example embodiment is required at least to compute a parameter condition satisfaction rate $SR_p^{past}$ in past once on the operation day. In other words, the operation-mode switching determination unit 102 can use the parameter condition satisfaction rate computed once on the operation day.

That is, the operation-mode switching determination unit 102 can compute the condition satisfaction rate SR based on the past data while reducing the computation amount on the operation day. Therefore, the operation-mode switching determination unit 102 can more appropriately perform the operation-mode switching determination processing.

Description of Operation

Figure 3:
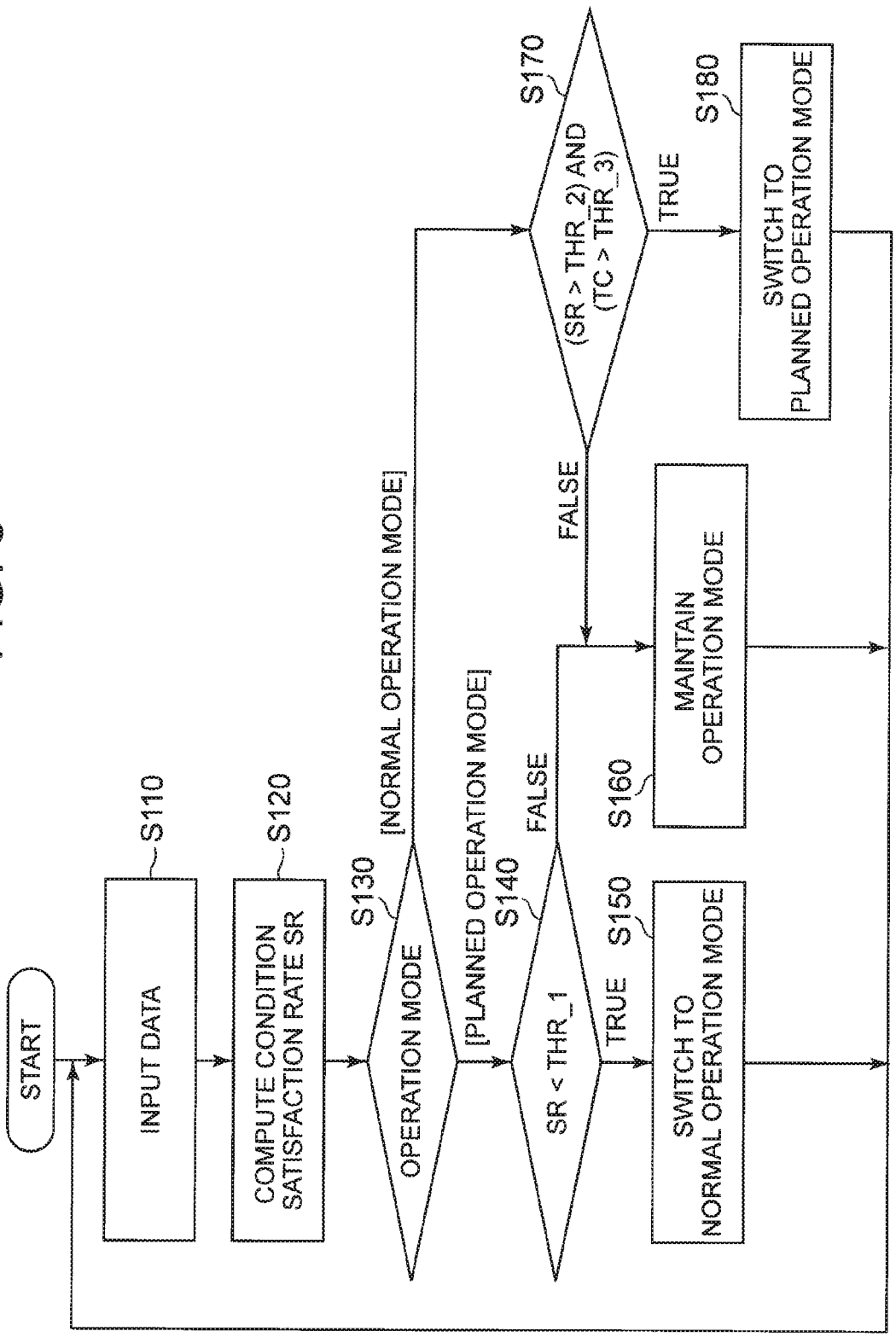
FIG. 3 is a flowchart showing an operation of operation-mode switching processing by an operation-mode switching device 100 of the first example embodiment.

Hereinafter, the operation in which the operation-mode switching device 100 of the present example embodiment switches the operation mode of the target air conditioning system will be described with reference to FIG. 3. FIG. 3 is a flowchart showing the operation of the operation-mode switching processing by the operation-mode switching device 100 of the first example embodiment.

First, data required for the determination processing by the operation-mode switching determination unit 102 is input to the input unit 101 (step S110). The input unit 101 inputs the input data to the operation-mode switching determination unit 102.

Note that the input unit 101 may compute a prediction error of a parameter on the basis of the input data, and may input the computed prediction error to the operation-mode switching determination unit 102. In addition, the input unit 101 may input a value of a parameter computed prior to the operation day, to the operation-mode switching determination unit 102.

Next, the operation-mode switching determination unit 102 computes the condition satisfaction rate SR, with the input data (step S120).

Next, the operation-mode switching determination unit 102 verifies whether the stored operation mode is the planned operation mode or the normal operation mode (step S130).

When the stored operation mode is the planned operation mode ([planned operation mode] in step S130), the operation-mode switching determination unit 102 verifies whether or not the condition satisfaction rate SR is smaller than the threshold THR_1 (step S140).

When the condition satisfaction rate SR is smaller than the threshold THR_1 (True in step S140), the operation-mode switching determination unit 102 switches the operation mode to the normal operation mode (step S150). After switching to the normal operation mode, the operation-mode switching device 100 performs the processing in step S110 again.

When the condition satisfaction rate SR is greater than or equal to the threshold THR_1 (False in step S140), the operation-mode switching determination unit 102 maintains the operation mode in the planned operation mode (step S160). After the maintenance, the operation-mode switching device 100 performs the processing in step S110 again.

When the stored operation mode is the normal operation mode ([normal operation mode] in step S130), the operation-mode switching determination unit 102 verifies whether or not the condition satisfaction rate SR is greater than the threshold THR_2 and the continued operation time TC is longer than the threshold THR_3 (step S170).

When the condition satisfaction rate SR is greater than the threshold THR_2 and the continued operation time TC is longer than the threshold THR_3 (True in step S170), the operation-mode switching determination unit 102 switches the operation mode to the planned operation mode (step S180).

Note that when either the condition satisfaction rate SR is greater than the threshold THR_2 or the continued operation time TC is longer than the threshold THR_3 is satisfied, the operation-mode switching determination unit 102 may switch the operation mode to the planned operation mode. After switching to the planned operation mode, the operation-mode switching device 100 performs the processing in step S110 again.

When the condition satisfaction rate SR is less than or equal to the threshold THR_2, or the continued operation time TC is less than or equal to the threshold THR_3 (False in step S170), the operation-mode switching determination unit 102 maintains the operation mode in the normal operation mode (step S160). After the maintenance, the operation-mode switching device 100 performs the processing in step S110 again.

Description of Effects

The operation-mode switching device 100 of the present example embodiment is a device that provides the operation-mode switching method associated with an air conditioning system having, as the operation mode, a planned operation mode based on a prediction model and a normal operation mode. The operation-mode switching device 100 of the present example embodiment is capable of automatically switching between the planned operation mode based on the prediction model and the normal operation mode, so that the operation mode of the air conditioning system can be switched in consideration of the state of indoor environment.

When the operation-mode switching device 100 of the present example embodiment is used, frequent switching of the operation mode does not happen. Thus, situations can be reduced in which a person present inside a room that is the operation subject of the air conditioning system feels uncomfortable with the operation mode switching. In addition, when the operation-mode switching device 100 of the present example embodiment is used, the operation-mode switching determination is performed with the condition satisfaction level for energy saving particularly considered as the state of indoor environment. Thus, high energy saving performance is achieved.

The operation-mode switching device 100 of the present example embodiment is used as part of the building management system, for example. When used as part of the building management system, the operation-mode switching device 100 can control air conditioners in a building.

Note that the operation-mode switching device 100 of the present example embodiment may be achieved by, for example, a central processing unit (CPU) that executes processing in accordance with a program stored in a non-transitory storage medium. That is, the input unit 101, the operation-mode switching determination unit 102, and the operation-mode switching control unit 103 may be achieved by a CPU that executes processing in accordance with program control, for example.

In addition, each unit in the operation-mode switching device 100 of the present example embodiment may be achieved by a hardware circuit. As an example, each of the input unit 101, the operation-mode switching determination unit 102, and the operation-mode switching control unit 103 is achieved by a large scale integration (LSI). Alternatively, those units may be achieved by a single LSI.

Figure 4:
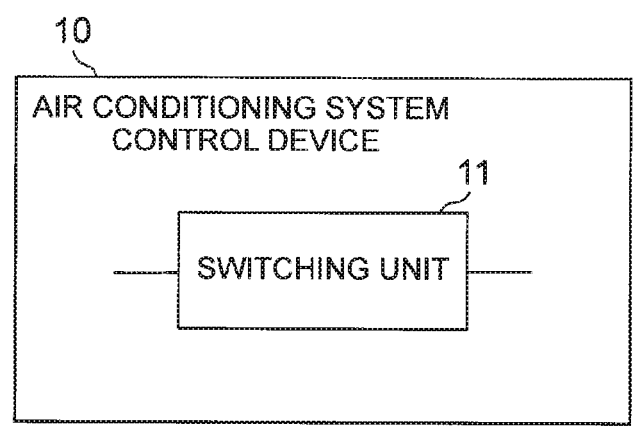
FIG. 4 is a block diagram showing the overview of an air conditioning system control device according to the present invention.

Next, the overview of the present invention will be described. FIG. 4 is a block diagram showing the overview of the air conditioning system control device according to the present invention. An air conditioning system control device 10 according to the present invention includes: a switching unit 11 (e.g., operation-mode switching determination unit 102) that, when a parameter relating to the indoor environment in which the air conditioning system operates does not satisfy a first condition while the air conditioning system is operating in a first operation mode (e.g., planned operation mode) that is an operation mode in which setting values computed on the basis of a prediction model are used as the setting values for the air conditioning system, switches the operation mode of the air conditioning system to a second operation mode (e.g., normal operation mode) that is an operation mode in which the computed setting values are not used as the setting values for the air conditioning system.

Such a configuration allows the air conditioning system control device to switch the operation mode of the air conditioning system in consideration of the state of indoor environment.

In addition, the first condition may be that the condition satisfaction level is greater than a first threshold, the condition satisfaction level being computed on the basis of a degree that a value of the parameter relating to the indoor environment satisfies a condition associated with the parameter.

Such a configuration allows the air conditioning system control device to switch the operation mode on the basis of a parameter condition satisfaction level of the parameter relating to the indoor environment.

In addition, the switching unit 11 may switch the operation mode of the air conditioning system to the first operation mode, when the parameter relating to the indoor environment in which the air conditioning system operates satisfies the second condition while the air conditioning system is operating in the second operation mode.

Such a configuration allows the air conditioning system control device to switch the operation mode of the air conditioning system in consideration of the state of indoor environment.

Moreover, the second condition may be that the condition satisfaction level is greater than a second threshold, and the second threshold may be greater than the first threshold.

Furthermore, the second condition may be that a continued operation time in the second operation mode of the air conditioning system is longer than a third threshold.

Such a configuration allows the air conditioning system control device to reduce the switching frequencies of the operation mode of the air conditioning system.

Furthermore, the condition associated with the parameter relating to the indoor environment may be that the value of the parameter is within a predetermined range.

Furthermore, the parameter relating to the indoor environment may include at least one of indoor temperature that is temperature in the indoor environment, a comfort level in the indoor environment, and the power consumption of the air conditioning system.

Such a configuration allows the air conditioning system control device to switch the operation mode of the air conditioning system in consideration of comfort in indoor environment and the energy saving performance of the air conditioning system.

Furthermore, the value of the parameter relating to the indoor environment may include a measured value of the parameter. Furthermore, the measured values of the parameter may include at least measured values of the indoor temperature that is the temperature in the indoor environment.

Such a configuration allows the air conditioning system control device to switch the operation mode on the basis of the measured indoor temperature.

Furthermore, the measured values of the parameter may include measured values at a date and time in past earlier than the date and time when the condition satisfaction level is computed.

Such a configuration allows the air conditioning system control device to switch the operation mode on the basis of the past measured values.

Furthermore, the value of the parameter relating to the indoor environment may include an index indicating the accuracy of the predicted values of the parameter, the predicted values being computed on the basis of the prediction model. Furthermore, as an index indicating the accuracy of the predicted values of the parameter, a prediction error that is an error between the measured values of the parameter and the predicted values may be used.

Such a configuration allows the air conditioning system control device to switch the operation mode on the basis of the prediction accuracy of the prediction model.

Furthermore, the prediction error may include any of a prediction error of indoor temperature, a prediction error of a comfort level, a prediction error of the power consumption of the air conditioning system, a prediction error of solar radiation, and a prediction error of outside air temperature, or a combination of each prediction error.

Such a configuration allows the air conditioning system control device to switch the operation mode on the basis of various features for indoor environment.

Furthermore, the prediction error may include an error between the measured values of the parameter at the date and time in past earlier than the date and time when the condition satisfaction level is computed and the predicted values of the parameter computed on the date and time in past.

Such a configuration allows the air conditioning system control device to switch the operation mode on the basis of the past prediction error.

Furthermore, the air conditioning system control device 10 may include a control unit (e.g., operation-mode switching control unit 103) that controls the operation mode of the air conditioning system in accordance with an operation-mode control value.

Such a configuration allows the air conditioning system control device to cause the air conditioning system to operate in the operation mode with the state of indoor environment considered.

The present invention is suitably used when an operation planning technique based on a prediction model is constructed as a system.

The invention of the present application has been described above with reference to the example embodiment and examples; however, the invention of the present application is not limited to the example embodiment and examples described above. Various changes that can be understood by those skilled in the art can be made to the configuration and details of the invention of the present application within the scope of the invention of the present application.

REFERENCE SIGNS LIST

10 Air conditioning system control device
11 Switching unit
100 Operation-mode switching device
101 Input unit
102 Operation-mode switching determination unit
103 Operation-mode switching control unit

The invention claimed is:

1. An air conditioning system operation mode switching method comprising:
when a parameter relating to the indoor environment in which an air conditioning system operates does not satisfy a first condition while the air conditioning system is operating in a first operation mode that is an operation mode in which setting values computed on the basis of a prediction model are used as the setting values for the air conditioning system, switching the operation mode of the air conditioning system to a second operation mode that is an operation mode in which the computed setting values are not used as the setting values for the air conditioning system; and
switching the operation mode of the air conditioning system to the first operation mode, when the parameter relating to the indoor environment in which the air conditioning system operates satisfies a second condition while the air conditioning system is operating in the second operation mode,
wherein the first condition is that a condition satisfaction level is greater than a first threshold, the condition satisfaction level being computed based on a parameter condition satisfaction rate that is computed by comparison between a weighted mean value of the parameter from a predetermined time to a past time by a predetermined time window and a parameter threshold, representing a degree that a value of the parameter relating to the indoor environment satisfies a condition associated with the parameter,
the second condition is that the condition satisfaction level is greater than a second threshold,
the second threshold is greater than the first threshold, and
the second condition is further that a continued operation time in the second operation mode of the air conditioning system is longer than a third threshold.

2. The air conditioning system operation mode switching method according to claim 1,
wherein the condition associated with the parameter relating to the indoor environment is that the value of the parameter is within a predetermined range.

3. The air conditioning system operation mode switching method according to claim 1,
wherein the condition associated with the parameter relating to the indoor environment is that the value of the parameter is within a predetermined range.

4. The air conditioning system operation mode switching method according to claim 1,
wherein the parameter relating to the indoor environment includes at least one of indoor temperature that is temperature in the indoor environment, a comfort level in the indoor environment, and power consumption of the air conditioning system.

5. The air conditioning system operation mode switching method according to claim 1,
wherein the value of the parameter relating to the indoor environment includes a measured value of the parameter.

6. The air conditioning system operation mode switching method according to claim 5,
wherein the measured values of the parameter include at least measured values of the indoor temperature.

7. The air conditioning system operation mode switching method according to claim 5,
wherein the measured values of the parameter include measured values at a date and time in past earlier than a date and time when a condition satisfaction level is computed.

8. The air conditioning system operation mode switching method according to claim 1,
wherein the value of the parameter relating to the indoor environment includes an index indicating accuracy of predicted values of the parameter, the predicted values being computed on the basis of the prediction model.

9. The air conditioning system operation mode switching method according to claim 8,
wherein as the index indicating the accuracy of the predicted values of the parameter, a prediction error that is an error between the measured values of the parameter and the predicted values is used.

10. The air conditioning system operation mode switching method according to claim 9,
wherein the prediction error includes any of a prediction error of indoor temperature, a prediction error of a comfort level, a prediction error of power consumption of the air conditioning system, a prediction error of solar radiation, and a prediction error of outside air temperature, or a combination of each prediction error.

11. The air conditioning system operation mode switching method according to claim 9,
wherein the prediction error includes an error between the measured values of the parameter at a date and time in past earlier than a date and time when a condition satisfaction level is computed and the predicted values of the parameter computed on the date and time in past.

12. An air conditioning system operation mode switching device comprising:
a switching unit that, when a parameter relating to the indoor environment in which an air conditioning system operates does not satisfy a first condition while the air conditioning system is operating in a first operation mode that is an operation mode in which setting values computed on the basis of a prediction model are used as the setting values for the air conditioning system, switches the operation mode of the air conditioning system to a second operation mode that is an operation mode in which the computed setting values are not used as the setting values for the air conditioning system, and switches the operation mode of the air conditioning system to the first operation mode, when the parameter relating to the indoor environment in which the air conditioning system operates satisfies a second condition while the air conditioning system is operating in the second operation mode,
wherein the first condition is that a condition satisfaction level is greater than a first threshold, the condition satisfaction level being computed based on a parameter condition satisfaction rate that is computed by comparison between a weighted mean value of the parameter from a predetermined time to a past time by a predetermined time window and a parameter threshold, representing a degree that a value of the parameter relating to the indoor environment satisfies a condition associated with the parameter,
the second condition is that the condition satisfaction level is greater than a second threshold,
the second threshold is greater than the first threshold, and
the second condition is further that a continued operation time in the second operation mode of the air conditioning system is longer than a third threshold.

13. A non-transitory computer-readable capturing medium having captured therein an air conditioning system operation mode switching program for causing a computer to execute processing of:
when a parameter relating to the indoor environment in which an air conditioning system operates does not satisfy a first condition while the air conditioning system is operating in a first operation mode that is an operation mode in which setting values computed on the basis of a prediction model are used as the setting values for the air conditioning system, switching the operation mode of the air conditioning system to a second operation mode that is an operation mode in which the computed setting values are not used as the setting values for the air conditioning system; and
switching the operation mode of the air conditioning system to the first operation mode, when the parameter relating to the indoor environment in which the air conditioning system operates satisfies a second condition while the air conditioning system is operating in the second operation mode,
wherein the first condition is that a condition satisfaction level is greater than a first threshold, the condition satisfaction level being computed based on a parameter condition satisfaction rate that is computed by comparison between a weighted mean value of the parameter from a predetermined time to a past time by a predetermined time window and a parameter threshold, representing a degree that a value of the parameter relating to the indoor environment satisfies a condition associated with the parameter,
the second condition is that the condition satisfaction level is greater than a second threshold,
the second threshold is greater than the first threshold, and
the second condition is further that a continued operation time in the second operation mode of the air conditioning system is longer than a third threshold.

* * * * *